United States Patent
Toyoda et al.

(10) Patent No.: US 9,833,898 B2
(45) Date of Patent: Dec. 5, 2017

(54) POSITIONING CONTROL APPARATUS

(71) Applicants: DENSO CORPORATION, Kariya, Aichi-pref. (JP); KYUSHU UNIVERSITY, NATIONAL UNIVERSITY CORPORATION, Higashi-ku, Fukuoka-shi, Fukuoka (JP)

(72) Inventors: Kazutaka Toyoda, Kariya (JP); Hideki Okuda, Nagoya (JP); Toshihiko Koyama, Anjo (JP); Makoto Hashizume, Fukuoka (JP); Riichi Ooutida, Fukuoka (JP)

(73) Assignees: DENSO CORPORATION, Kariya, Aichi-pref. (JP); KYUSHU UNIVERSITY, NATIONAL UNIVERSITY CORPORATION, Fukuoka-Shi, Fukuoka (JP)

( * ) Notice: Subject to any disclaimer, the term of this patent is extended or adjusted under 35 U.S.C. 154(b) by 25 days.

(21) Appl. No.: 14/848,615

(22) Filed: Sep. 9, 2015

(65) Prior Publication Data
US 2016/0075013 A1  Mar. 17, 2016

(30) Foreign Application Priority Data
Sep. 11, 2014  (JP) .................................. 2014-185413

(51) Int. Cl.
G06F 19/00 (2011.01)
B25J 9/16 (2006.01)
B25J 3/04 (2006.01)

(52) U.S. Cl.
CPC ................. *B25J 9/163* (2013.01); *B25J 3/04* (2013.01); *B25J 9/1689* (2013.01);
(Continued)

(58) Field of Classification Search
CPC ... B25J 9/1689; B25J 9/163; B25J 9/22; B25J 3/04; B25J 9/16; G05B 2219/45167;
(Continued)

(56) References Cited

U.S. PATENT DOCUMENTS 8,388,605 B2 * 3/2013 Umemoto .................. B25J 9/16
606/1
2005/0222714 A1 10/2005 Nihei et al.
(Continued)

FOREIGN PATENT DOCUMENTS

| JP | 2005293098 A | 10/2005 |
| JP | 2009107074 A | 5/2009 |
| JP | 2010269419 A | 12/2010 |

*Primary Examiner* — Rachid Bendidi
(74) *Attorney, Agent, or Firm* — Harness, Dickey & Pierce, P.L.C.

(57) ABSTRACT

In an apparatus for controlling the positioning of an object having a specified point, a first limiter establishes a movable range of the specified point of the object, and limits movement of the specified point of the object within the movable range. The movable range includes a line connecting the position of the specified point of the object and a target position for the specified point of the object. A second limiter limits change of a specified orientation of the object from increasing an angular difference between the specified orientation of the object a target orientation for the specified orientation of the object.

10 Claims, 7 Drawing Sheets

(52) U.S. Cl.
CPC ........... *G05B 2219/45117* (2013.01); *G05B 2219/45167* (2013.01); *Y10S 901/03* (2013.01); *Y10S 901/14* (2013.01); *Y10S 901/28* (2013.01); *Y10S 901/41* (2013.01)

(58) Field of Classification Search
CPC .......... G05B 2219/45117; G05B 19/42; G05B 19/423; Y10S 901/41; Y10S 901/03; Y10S 901/14; Y10S 901/28
See application file for complete search history.

(56) References Cited

U.S. PATENT DOCUMENTS

| | | | |
|---|---|---|---|
| 2009/0112316 A1 | 4/2009 | Umemoto et al. | |
| 2013/0310982 A1* | 11/2013 | Scheurer ............... | B25J 9/1664 700/263 |
| 2013/0312563 A1* | 11/2013 | Kawashima ............ | B25J 18/02 74/490.01 |
| 2014/0031838 A1* | 1/2014 | Namiki ................. | A61B 34/30 606/130 |
| 2014/0229005 A1* | 8/2014 | Suzuki ................. | B25J 9/1692 700/254 |
| 2015/0025683 A1* | 1/2015 | Amano ................. | B25J 9/1692 700/254 |
| 2015/0073596 A1* | 3/2015 | Fudaba .................... | B25J 3/04 700/259 |

\* cited by examiner

POSITIONING CONTROL APPARATUS

CROSS REFERENCE TO RELATED APPLICATIONS

This application is based on and claims the benefit of priority from Japanese Patent Application 2014-185413 filed on Sep. 11, 2014, the disclosure of which is incorporated in its entirety herein by reference.

TECHNICAL FIELD

The present disclosure relates to positioning control apparatuses for positioning an object.

BACKGROUND

One known robot control apparatus, which is disclosed in Japanese Patent Application Publication No. 2010-269419, grasps an object to be positioned using a robot arm. A user manipulates a controller to control motion of the robot arm to thereby locate the object to a predetermined target position in a three-dimensional space, at which the object is desired to be located. Three coordinate axes, which are labelled x, y, and z, define the three-dimensional space. The user also manipulates the controller to control motion of the robot arm to thereby direct the object toward a predetermined target orientation to which the object should be oriented in the three-dimensional space.

The controller of the disclosed robot control apparatus is provided with a first push-button switch provided for the x, y, and z axes and a second push-button switch provided for the x, y, and z axes. Pushing on the first push-button switch by a user causes the controller to limit movement of the object in all the x, y, and z axes of the three-dimensional coordinate system. Similarly, pushing on the second push-button switch by a user causes the controller to limit rotation of the object around each of the x, y, and z axes of the three-dimensional coordinate system. This limitation of rotation restricts change of the direction of the object. The limitation of both movement and change of direction of the object aims to prevent unintentional movement and unintentional change of direction of the object due to, for example, the shakes of the user's hands manipulating the controller.

SUMMARY

Unfortunately, the structure for positioning the object disclosed in the Patent Publication allows unintentional, i.e. unnecessary, movement and/or change of orientation of the object from the current location to a target location unless at least one of the first and second push-button switches is switched on. This therefore may result in inefficient positioning of the object to a target location.

One aspect of the present disclosure therefore seeks to provide positioning control apparatuses capable of addressing the problem set forth above.

Specifically, an alternative aspect of the present disclosure aims to provide such positioning control apparatuses, each of which is capable of controlling the positioning of an object efficiently while reducing unnecessary movement of the object and/or unnecessary change of orientation of the object during the positioning of the object.

According to an exemplary aspect of the present disclosure, there is provided an apparatus for controlling the positioning of an object having a specified point. The apparatus includes a support that deformably supports the object while a position of the specified point of the object and a specified orientation that the object has are changeable. The apparatus includes a first calculator that calculates the position of the specified point of the object according to how the support is deformed. The apparatus includes a second calculator that calculates the specified orientation of the object according to how the support is deformed. The apparatus includes a first limiter that establishes a movable range of the specified point of the object, and limits movement of the specified point of the object within the movable range. The movable range includes a line connecting the position of the specified point of the object calculated by the first calculator and a target position for the specified point of the object to reach. The apparatus includes a second limiter that limits change of the specified orientation of the object from increasing an angular difference between the specified orientation of the object calculated by the second calculator and a target orientation for the specified orientation of the object.

The configuration of the apparatus limits movement of the specified point of the object within the movable range, which includes the line connecting the position of the specified point of the object and the target position for the specified point of the object to reach. Additionally, the configuration of the apparatus limits change of the specified orientation of the object from increasing the angular difference between the specified orientation of the object and the target orientation for the specified orientation of the object.

The configuration of the apparatus prevents unintentional, i.e. unnecessary, movement out of the movable range. Additionally, the configuration of the apparatus prevents unintentional, i.e. unnecessary, change of the orientation of the object, which increases the angular difference between the specified orientation of the object and the target orientation for the specified orientation of the object. The configuration of the apparatus therefore results in more efficient positioning of the object to the target position and the target orientation.

Various aspects of the present disclosure can include and/or exclude different features, and/or advantages where applicable. In addition, various aspects of the present disclosure can combine one or more feature of other embodiments where applicable. The descriptions of features, and/or advantages of particular embodiments should not be construed as limiting other embodiments or the claims.

BRIEF DESCRIPTION OF THE DRAWINGS

Other aspects of the present disclosure will become apparent from the following description of embodiments with reference to the accompanying drawings in which.

DETAILED DESCRIPTION OF EMBODIMENT

Figure 1:
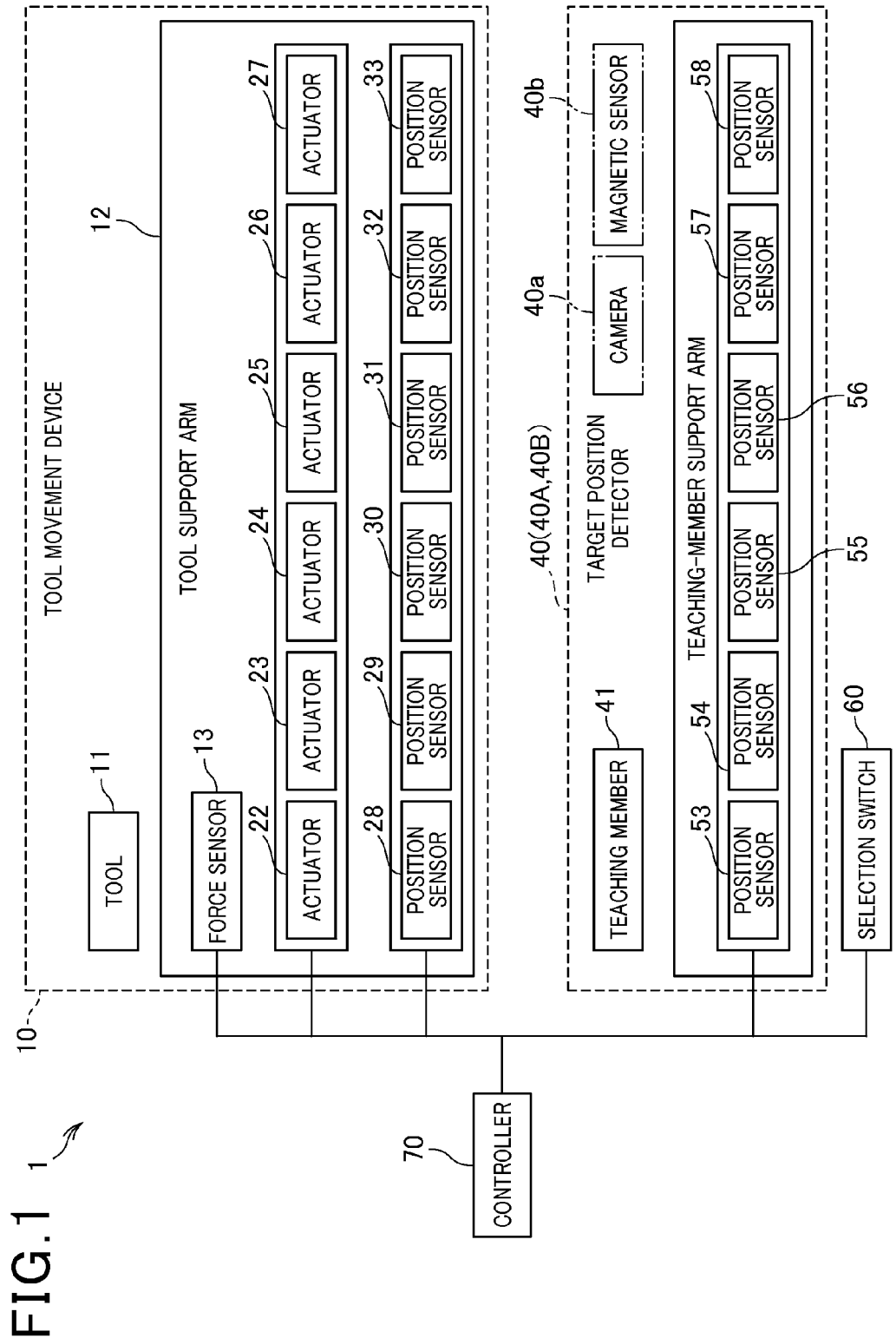
FIG. 1 is a block diagram schematically illustrating an example of the structure of a positioning control apparatus according to an embodiment of the present disclosure.

The following describes an embodiment of the present disclosure with reference to the accompanying drawings. The drawings utilize identical reference characters to identify identical corresponding components.

Figure 2:
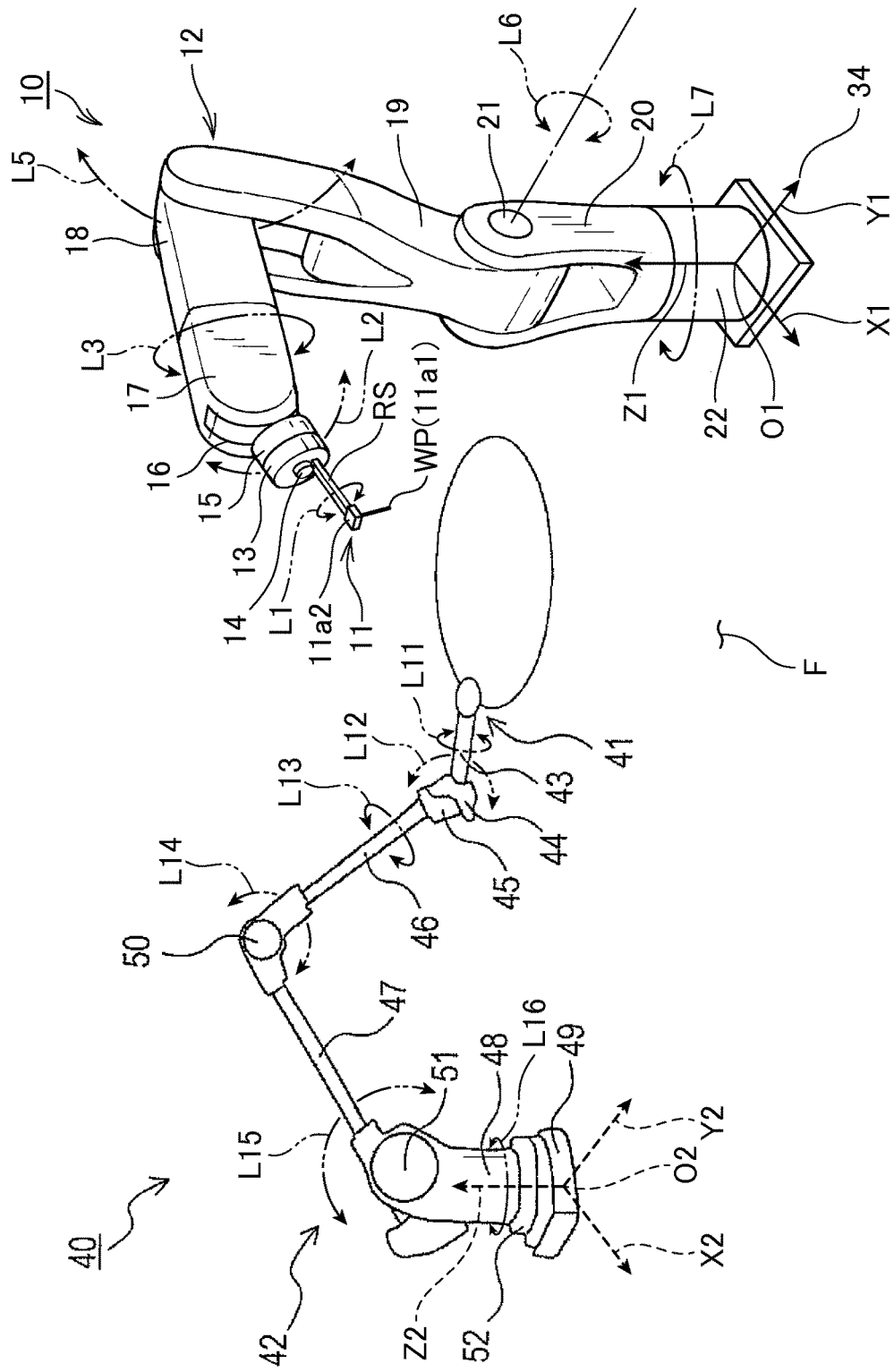
FIG. 2 is a perspective view schematically illustrating an example of the structure of a tool movement device and an example of the structure of a target position detector included in the positioning control apparatus according to the embodiment.

FIGS. 1 and 2 schematically illustrate a positioning control apparatus 1 according to the embodiment of the present disclosure. The positioning control apparatus 1 is used in the medical field, in particular, the dental field for locating a dental instrument to a predetermined position, such as the position of a missing tooth, in the mouth of a patient.

The positioning control apparatus 1 includes a tool movement device 10, a target position detector 40, a selection switch 60, and a controller 70.

The tool movement device 10 includes a tool 11, a rod-like rigid support RS, and a support arm 12. The support arm 12 serves as, for example, a support. The tool 11 is a dental instrument including a drill having a substantially longitudinal cylindrical shape, a first end 11a1 for cutting away part of a jawbone and/or a tooth, and a second end 11a2 opposite to the first end 11a1 in its axial direction. The rod-like rigid support RS having a first end to which the second end 11a2 of the tool 11 is attached while the length direction of the tool 11 is substantially perpendicular to the rigid support RS. Hereinafter, the assembly of the tool 11 and the rigid support RS will also be referred to simply as a tool 11.

The tool support arm 12 is designed as a multijoint arm that provides multiple degrees of freedom to thereby movably support the tool 11 while capable of freely changing the position and orientation of the tool 11, i.e. the position and orientation of the first end 11a1 of the tool (drill) 11. The first end 11a1 of the tool (drill) 11 will be also referred to as a working point WP of the tool 11, which serves as a specified point of the tool 11. For example, the tool support arm 12 includes a force sensor 13, a coupler 14, first to sixth links 15 to 20, unillustrated joints, a joint 21, actuators 22 to 27, and position sensors 28 to 33.

The coupler 14 has a substantially circular plate-like shape and opposing first and second major circular surfaces. The second end of the rigid support RS is coupled to the first major circular surface of the coupler 14.

The force sensor 13 has a substantially circular plate-like shape and opposing first and second major circular surfaces.

The second major circular surface of the coupler 14 is mounted on the first major circular surface of the force sensor 13.

When using the tool movement device 10, a user, such as a doctor, grasps a part of the tool 11 and applies force to the tool 11 to move the working point WP of the tool 11 to a desired position and a desired orientation according to deformation of the tool support arm 12, i.e. change of the posture of the tool support arm 12 via the joints. While the force is applied to the tool 11 so that force is applied to the coupler 14, the force sensor 13 measures the magnitude and orientation of the force being applied to the coupler 14.

The first to sixth links 15 to 20 are rigid members.

The first link 15 has a substantially circular plate-like shape, and first and second ends opposite to each other in an axial direction thereof. The first end of the first link 15 is directly joined to the second major circular surface of the force sensor 13.

The second end of the first link 15 is joined to the second link 16 via an unillustrated first joint while the first link 15 is rotatable about the axial direction thereof based on turning of the unillustrated first joint (see the two-dot chain line L1 in FIG. 2). Note that rotation of the first link 15 represents turning of the first link 15 with the position of its center of gravity being unchanged. That is, the tool 11, the force sensor 13, and the first link 15 are integrally rotatable about the axial direction of the first link 15 (see the two-dot chain line L1 in FIG. 2).

The second link 16 has a substantially circular plate-like shape, and first and second ends opposite to each other in an axial direction thereof. A portion of the circumferential side surface of the second link 16 is joined to the second end of the first link 15 via the unillustrated first joint set forth above. The second link 16 is joined to the third link 17 via an unillustrated second joint located perpendicular to the axial direction of the first link 15. The tool 11, the force sensor 13, and the first and second links 15 and 16 are integrally swingable about the axial direction of the second link 16 based on turning of the unillustrated second joint (see the two-dot chain line L2 in FIG. 2).

The third link 17 has a substantially pillar shape with a predetermined length, first forked ends, and a second end opposite to the first forked ends in a length direction thereof. The first forked ends of the third link 17 are joined to the second end of the second link 16 via the unillustrated second joint set forth above while the second link 16 is swingable based on rotation of the unillustrated second joint set forth above.

The second end of the third link 17 is joined to the fourth link 18 via an unillustrated third joint located perpendicular to the unillustrated second joint. The tool 11, the force sensor 13, and the first to third links 15 to 17 are integrally rotatable about the unillustrated third joint based on rotation of the unillustrated third joint (see the two-dot chain line L3 in FIG. 2).

The fourth link 18 has a substantially pillar shape with a predetermined length, and first and second ends opposite to each other in a length direction thereof. The first end of the fourth link 18 is joined to the second end of the third link 16 via the unillustrated third joint set forth above. The second end of the fourth link 18 is joined to the fifth link 19 via an unillustrated fourth joint. The tool 11, the force sensor 13, and the first to fourth links 15 to 18 are integrally swingable about the unillustrated fourth joint based on rotation of the unillustrated forth joint (see the two-dot chain line L5 in FIG. 2).

The fifth link 19 has a substantially pillar shape with a predetermined length, and first and second ends opposite to each other in a length direction thereof. The first end of the fifth link 19 has forked end portions, and the forked end portions are joined to the second end of the fourth link 18 via the unillustrated fourth joint set forth above. The second end of the fifth link 19 is joined to the sixth link 20 via a fifth joint 21 located substantially perpendicular to the length direction of the fifth link 19. The tool 11, the force sensor 13, and the first to fifth links 15 to 19 are integrally swingable about the fifth joint 21 based on rotation of the fifth joint 21 (see the two-dot chain line L6 in FIG. 2).

The sixth link 20 has a substantially pillar shape with a predetermined length, and first and second ends opposite to each other in a length direction thereof. The first end of the sixth link 20 has forked end portions, and the forked end portions are joined to the second end of the fifth link 19 via the fifth joint 21 set forth above. The second end of the sixth link 20 is joined to a cylindrical base 22 via an unillustrated sixth joint. The tool 11, the force sensor 13, and the first to sixth links 15 to 20 are integrally rotatable about the axial direction of the base 22 based on rotation of the unillustrated sixth joint (see the two-dot chain line L7 in FIG. 2).

The base 22 is located facing upwardly on a floor F of an operating room, which serves as, for example, a reference plane for the tool movement device 10, to support the tool support arm 12.

The actuator 22 and the position sensor 28 are provided for the first joint, and the actuator 23 and the position sensor 29 are provided for the second joint. The actuator 24 and the position sensor 30 are provided for the third joint, and the actuator 25 and the position sensor 31 are provided for the fourth joint. The actuator 26 and the position sensor 32 are provided for the fifth joint, and the actuator 27 and the position sensor 33 are provided for the sixth joint.

For example, each of the actuators 22 to 27 includes a motor. The actuator 22 is capable of rotating the first joint to thereby rotate the assembly of the elements 11, 13, and 15 about the first joint relative to the second link 16. The actuator 23 is capable of rotating the second joint to thereby swing the assembly of the elements 11, 13, 15, and 16 about the second joint relative to the third link 17.

The actuator 24 is capable of rotating the third joint to thereby rotate the assembly of the elements 11, 13, and 15 to 17 about the third joint relative to the fourth link 18. The actuator 25 is capable of rotating the fourth joint to thereby swing the assembly of the elements 11, 13, and 15 to 18 about the fourth joint relative to the fifth link 19.

The actuator 26 is capable of rotating the fifth joint to thereby swing the assembly of the elements 11, 13, and 15 to 19 about the fifth joint 21 relative to the sixth link 20. The actuator 27 is capable of rotating the sixth joint to thereby rotate the assembly of the elements 11, 13, and 15 to 20 about the sixth joint relative to the base 22.

Each of the position sensors 28 to 33 includes an encoder. The position sensor 28 measures the angular position or rotation quantity of the first joint caused by the actuator 22, and the position sensor 29 measures the angular position or rotation quantity of the second joint caused by the actuator 23. The position sensor 30 measures the angular position or rotation quantity of the third joint caused by the actuator 24, and the position sensor 31 measures the angular position or rotation quantity of the fourth joint caused by the actuator 25. The position sensor 32 measures the angular position or rotation quantity of the fifth joint 21 caused by the actuator 26, and the position sensor 33 measures the angular position or rotation quantity of the sixth joint caused by the actuator 27.

As described above, the tool support arm 12 includes the three joints, i.e. the first joint, the third joint, and the sixth joint, each of which is capable of rotating a corresponding assembly of links and the like. The tool support arm 12 also includes the three joints, i.e. the second joint, the fourth joint, and the fifth joint, each of which is capable of swinging a corresponding assembly of links and the like. The third joint enables a plane on which the second joint swings the corresponding assembly of links together therewith to be non-parallel to a plane on which the fourth joint swings the corresponding assembly of links together therewith. That is, the tool support arm 12 enables the position and/or orientation of the tool 11, i.e. the working point WP of the tool 11, to be changeable according to the rotation of at least one of the first to sixth joints.

The target position detector 40 includes a teaching member 41 and a teaching-member support arm 42.

The teaching member 41 serves to teach a target position and a target orientation for the working point WP of the tool 11 when a predetermined reference point of the teaching member 41 is fixedly located at a reference object predetermined relative to the target position. That is, the target position represents a position whether the working point WP of the tool 11 should be located, and the target orientation represents a specified orientation to which the working point WP of the tool 11 should be oriented. In this embodiment, the position of the top of a portion of the jawbone of a patient, which corresponds to the missing tooth in the mouth of the patient, represents the target position. When the working point WP of the tool 11 is located at the target position, an orientation of the tool 11, which is required to drill the target position, which is the top of the portion of the jawbone, represents the target orientation.

In this embodiment, the reference object represents a predetermined tooth in the mouth of the patient located close to the missing tooth, and the teaching member 41 is for example designed as a tooth piece is overlaid on the predetermined tooth to cover it.

In other words, when the predetermined reference point of the teaching member 41 is fixedly located at the reference object, i.e. the predetermined tooth close to the missing tooth, by, for example, a user, such as a doctor or an assistant, the location of the predetermined reference point of the teaching member 41 enables the target position for the working point WP of the tool 11 to be understood by the user. In addition, setting the orientation of the predetermined reference point of the teaching member 41 to the reference object, i.e. the predetermined tooth, enables the target orientation for the working point WP of the tool 11 to be understood by the user.

The teaching-member support arm 42 is designed as a multijoint arm that provides multiple degrees of freedom to thereby movably support the teaching member 41 while capable of freely changing the position and orientation of the teaching member 41.

For example, the teaching-member support arm 42 includes first to sixth links 43 to 48, a base 49, unillustrated joints, joints 50-52, and position sensors 53 to 58.

The first to sixth links 43 to 48 are for example, rigid members.

The first link 43 has a substantially bar shape and first and second ends opposite to each other in its longitudinal direction. The first end of the first link 43 is directly joined to the teaching member 41. The second end of the first link 43 is joined to the second link 44 via an unillustrated first joint. The first link 43 and the teaching member 41 are integrally rotatable about the unillustrated first joint based on rotation of the unillustrated first joint (see the two-dot chain line L11 in FIG. 2).

The second link 44 has first and second ends opposite to each other. The first end of the second link 44 is joined to the second end of the first link 43 via the unillustrated first joint set forth above. The second end of the second link 44 is joined to the third link 45 via an unillustrated second joint. The teaching member 41, the first link 43, and the second link 44 are integrally swingable about the unillustrated second joint based on rotation of the unillustrated second joint (see the two-dot chain line L12 in FIG. 2).

The third link 45 has a substantially cylindrical shape, and first and second ends opposite to each other in its axial direction. The first end of the third link 45 is joined to the second end of the second link 44 via the unillustrated second joint set forth above. The second end of the third link 45 is joined to the fourth link 46 via an unillustrated third joint. The teaching member 41 and the first to third links 43 to 45 are integrally rotatable about the unillustrated third joint based on rotation of the third joint (see the two-dot chain line L13 in FIG. 2).

The fourth link 46 has a substantially bar shape, and first and second ends opposite to each other in its longitudinal direction. The first end of the fourth link 46 is joined to the second end of the third link 45 via the unillustrated third joint set forth above. The second end of the fourth link 46 is joined to the fifth link 47 via a fourth joint 50. The teaching member 41 and the first to fourth links 43 to 46 are integrally swingable about the fourth joint 50 based on rotation of the fourth joint 46 (see the two-dot chain line L14 in FIG. 2).

The fifth link 47 has a substantially bar shape, and first and second ends opposite to each other in its longitudinal direction. The first end of the fifth link 47 is joined to the second end of the fourth link 47 via the fourth joint 46 set forth above. The second end of the fifth link 47 is joined to the sixth link 48 via a fifth joint 51. The teaching member 41 and the first to fifth links 43 to 47 are integrally swingable about the fifth joint 51 based on rotation of the fifth joint 51 (see the two-dot chain line L15 in FIG. 2).

The sixth link 48 has a substantially cylindrical shape, and first and second ends opposite to each other in its axial direction. The first end of the sixth link 48 has forked end portions, and the forked end portions are joined to the second end of the fifth link 47 via the fifth joint 51 set forth above. The second end of the sixth link 48 is joined to a substantially rectangular-parallelepiped base 49 via a cylindrical sixth joint 52. The teaching member 41 and the first to sixth links 43 to 48 are integrally rotatable about the axial direction of the cylindrical sixth joint 52 based on rotation of the cylindrical sixth joint 52 (see the two-dot chain line L16 in FIG. 2).

The base 49 is located facing upwardly on the floor F of the operating room to support the teaching-member support arm 42.

The position sensor 53 is provided for the first joint, and the position sensor 54 is provided for the second joint. The position sensor 55 is provided for the third joint, and the position sensor 56 is provided for the fourth joint 50. The position sensor 57 is provided for the fifth joint 51, and the position sensor 58 is provided for the sixth joint 52.

Each of the position sensors 53 to 58 includes an encoder. The position sensor 53 measures the angular position or rotation quantity of the first joint, and the position sensor 54 measures the angular position or rotation quantity of the second joint. The position sensor 55 measures the angular position or rotation quantity of the third joint, and the position sensor 56 measures the angular position or rotation quantity of the fourth joint 50. The position sensor 57 measures the angular position or rotation quantity of the fifth joint 51, and the position sensor 58 measures the angular position or rotation quantity of the sixth joint 52.

As described above, the teaching-member support arm 42, which is designed as a multijoint arm, enables a doctor or an assistant to freely move the teaching member 41 based on change of the posture of the teaching-member support arm 42 via the first to sixth joints. Motion of the body of the patient to which the teaching member 41 is fixedly located changes the target position and the target orientation for the working point WP of the tool 11. This causes the location and orientation of the teaching member 41 to follow the change of the target position and the target orientation for the working point WP of the tool 11 based on deformation of the teaching-member support arm 42 via the first to sixth joints.

The selection switch 60 is designed as, for example, a user-operable switch and communicably connected to the controller 70. Specifically, the controller 70 can select one of a position control mode and an orientation control mode as plural operation modes of the controller 70 according to how a doctor or an assistant operates the selection switch 60.

The position control mode includes a first position control mode and a second position control mode. The controller 70 is programmed to set the operation mode thereof to one of the first position control mode, the second position control mode, and the orientation control mode.

When setting the operation mode to the first position control mode, the controller 70 operates in the first position control mode to (1) Determine a movable region for the working point WP of the tool 11

(2) Move the tool 11 with free change of the orientation of the tool 11 while restricting movement of the tool 11 to prevent the working point WP of the tool 11 from going out of the movable region.

When setting the operation mode to the second position control mode, the controller 70 operates in the second position control mode to (1) Determine a movable region for the working point WP of the tool 11

(2) Move the tool 11 while restricting change of the orientation of the tool 11 and movement of the tool 11 to prevent the working point WP of the tool 11 from going out of the movable region.

When setting the operation mode to the orientation mode, the controller 70 operates in the orientation control mode to (1) Restrict movement of the tool 11 to maintain the position of the working point WP of the tool 11 unchanged (2) Change the orientation of the tool 11 while preventing the angular difference between the changed orientation of the tool 11, i.e. its working point WP, and the target orientation from increasing.

The controller 70 is, for example, designed as a known microcomputer circuit including, for example, a CPU, a ROM, and a RAM. The controller 70 is communicably connected to the force sensor 13, the actuators 22 to 27, the position sensors 28 to 33 and 53 to 58, and the selection switch 60.

The controller 70 receives, from each of the position sensors 28 to 33, the angular position or rotation quantity of the corresponding joint measured thereby. Then, the controller 70 calculates the current posture of the tool support arm 12, i.e. how the tool support arm 12 is deformed. Based on the calculated posture of the tool support arm 12, the controller 70 calculates the position and orientation of the working point WP of the tool 11.

The controller 70 also receives, from each of the position sensors 53 to 58, the angular position or rotation quantity of the corresponding joint measured thereby. Then, the controller 70 calculates the current posture of the teaching-member support arm 42, i.e. how the teaching-member support arm 42 is deformed. Based on the calculated posture of the teaching-member support arm 42, the controller 70 calculates the position and orientation of the teaching member 41, i.e. the target position and target orientation for the working point WP of the tool 11.

As described above, the controller 70 selects, as the operation mode, among the first position control mode, the second position control mode, and the orientation control mode according to selection information sent from the selection switch 60 each time one of the above control modes is selected by the selection switch.

For example, when starting the positioning of the tool 11, a user or an assistant according to this embodiment operates the selection switch 60 to select the position control mode as the operation mode of the controller 70, and the controller 70 operates in the first position control mode. Thereafter, the controller 70 automatically switches the operation mode to the orientation control mode when the working point WP of the tool 11 has reached the target position.

Additionally, the controller 70 forcibly switches the operation mode to the orientation control mode in response to when the selection information representing selection of the orientation control mode is sent from the selection switch 60 although the working point WP of the tool 11 has not reached yet the target position.

Similarly, the controller 70 forcibly switches the operation mode from the orientation control mode to the second position control mode in response to when the selection information representing selection of the position control mode is sent from the selection switch 60 while the working point WP of the tool 11 has reached the target position O3.

The controller 70 performs the following first position change routine (see FIG. 3) according to, for example, force applied to the tool 11 by a user while operating in the first position control mode, thus changing the posture of the tool support arm 12. In other words, the controller 70 performs the following first position change routine each time force is applied to the tool 11 by a user while operating in the first position control mode.

In addition, the controller 70 performs the following orientation change routine (see FIG. 6) according to, for example, force applied to the tool 11 by a user while operating in the orientation control mode, thus changing the posture of the tool support arm 12. In other words, the controller 70 performs the following orientation change routine each time force is applied to the tool 11 by a user while operating in the orientation control mode.

Moreover, the controller 70 performs the following second position change routine (see FIG. 8) according to, for example, force applied to the tool 11 by a user while operating in the second position control mode, thus changing the posture of the tool support arm 12. In other words, the controller 70 performs the following second position change routine each time force is applied to the tool 11 by a user while operating in the second position control mode.

Figure 3:
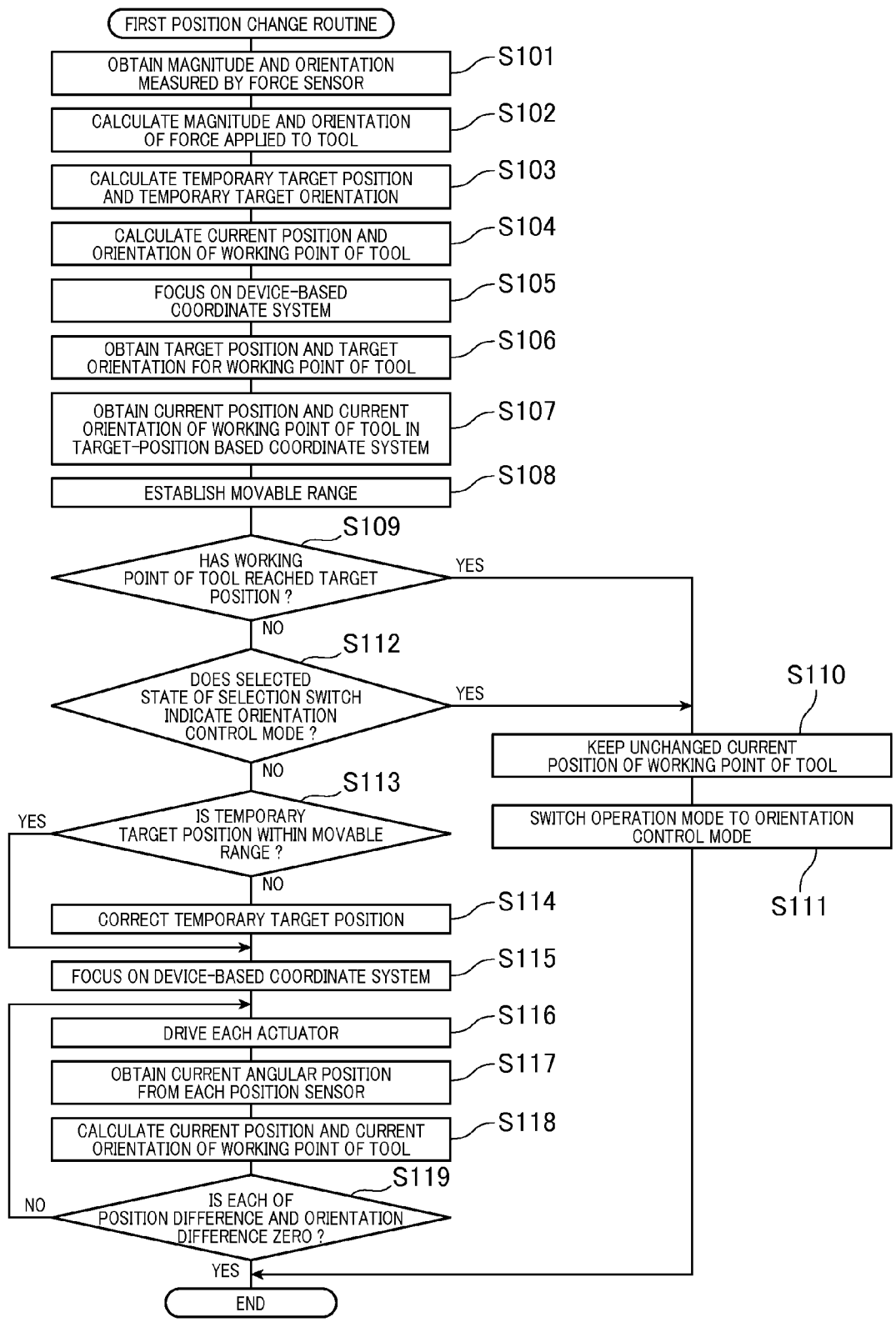
FIG. 3 is a flowchart schematically illustrating an example of the procedure of a first position change routine carried out by a controller illustrated in FIG. 1.

The following describes the first position change routine carried out by the controller 70 with reference to the flowchart of FIG. 3. The controller 70 is programmed to start the first position change routine upon determination that the force sensor 13 measures user's force applied to the tool 11 in the first position control mode.

Before execution of the first position change routine, a user, such as a doctor or an assistant, manually moves the teaching member 41 based on change of the posture of the teaching-member support arm 42 to fixedly locate the teaching member 41 to the predetermined tooth close to the missing tooth as the reference object. In addition, the user manually sets the orientation of the predetermined reference point of the teaching member 41 to the reference object, i.e. the predetermined tooth, which represents the target orientation for the working point WP of the tool 11.

When starting the first position change routine, the controller 70 obtains the magnitude and orientation of force measured by the force sensor 13 in step S101. The force measured by the force sensor 13 is represented as a three-dimensional vector in a predetermined sensor-based coordinate system defined in the first major circular surface on which the coupler 14 is mounted. The sensor-based coordinate system follows change of the position of the force sensor 13. The sensor-based coordinate system has a first coordinate axis corresponding to, for example, the center axis of the first major circular surface of the force sensor 13, and the other second and third coordinate axes are defined to be perpendicular to the first coordinate axis.

Figure 4:
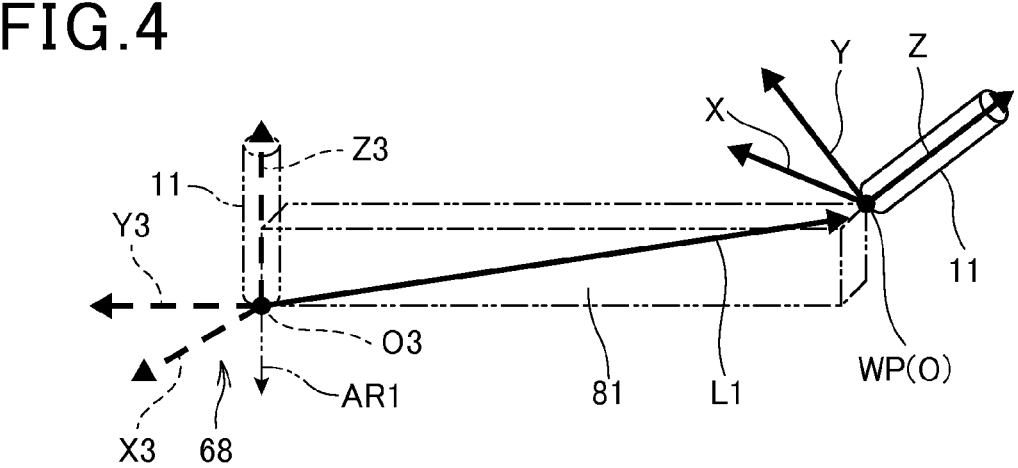
FIG. 4 is a view schematically illustrating an example of a movable range defined by the controller.

Next, the controller 70 calculates the magnitude and orientation of force applied to the tool 11 in a tool-based coordinate system 65 defined in the tool 11 in step S102 (see FIG. 4). The tool-based coordinate system 65 follows change of the position of the tool 11. The tool-based coordinate system 65, which is, for example, a three-dimensional coordinate system, has an origin O corresponding to the working point WP of the tool 11, i.e. the first end 11a1 of the tool 11, and a first axis Z corresponding to, for example, the axial direction of the tool 11. The tool-based coordinate system 65 also has the other second and third axes X and Y defined to be perpendicular to the first coordinate axis and passing through the origin O.

Specifically, in step S102, the controller 70 calculates the magnitude and orientation of the force applied to the tool 11 according to the magnitude and orientation of the force obtained in step S101; the force obtained in step S101 represents force applied to the coupler 14 between the tool 11 and the force sensor 13.

Subsequently, the controller 70 calculates, according to the magnitude and orientation of the force calculated in step S102, a temporary target position and a temporary target orientation of the working point WP of the tool 11 in a three-dimensional device-based coordinate system 34 in step S103. The device-based coordinate system 34 is defined in, for example, a circular portion of the floor F on which the base 22 is mounted. For example, the device-based coordinate system 34 includes an origin O1 corresponding to the center of the circular portion of the floor F on which the base 22 is mounted. The device-based coordinate system 34 includes a first axis Z1 corresponding to, for example, the axial direction of the base 22 extending from the origin. The device-based coordinate system 34 also includes second and third axes X1 and Y1 extending from the origin O1 to be perpendicular to the first axis Z1 to the respective predetermined directions (see FIG. 2).

Specifically, the temporary target position for the working point WP of the tool 11 represents a temporary destination for the working point WP of the tool 11 calculated in step S102 based on the user's force applied to the tool 11, in other words, the user's intended destination to which the working point WP of the tool 11 should be moved. The temporary target orientation for the working point WP of the tool 11 represents a temporary orientation for the working point WP of the tool 11 calculated in step S102 based on the user's force applied to the tool 11, in other words, the user's intended orientation to which the working point WP of the tool 11 should be directed.

Following the operation in step S103, the controller 70 calculates the current position and orientation of the working point WP of the tool 11 according to the current angular position or rotation quantity of each joint of the tool support arm 12 measured by the corresponding position sensor in step S104.

At that time, as described above, the teaching member 41 has been moved such that the predetermined reference point of the teaching member 41 has been located at the reference object, i.e. the predetermined tooth. The position and orientation of the reference point of the teaching member 41 enable the target position and the target orientation for the working point WP of the tool 11 to be understood.

Thus, following the operation in step S104, the controller 70 focuses on a three-dimensional detector-based coordinate system 59 in place of the device-based coordinate system 34 in step S105. The detector-based coordinate system 59 is defined in, for example, a rectangular portion of the floor F on which the base 49 is mounted. For example, the detector-based coordinate system 59 includes an origin O2 corresponding to the center of the rectangular portion of the floor F on which the base 49 is mounted. The detector-based coordinate system 59 includes a first axis Z2 corresponding to, for example, the vertical direction of the base 49 extending from the origin O2. The detector-based coordinate system 59 also includes second and third axes X2 and Y2 extending from the origin O2 to be perpendicular to the first axis Z2 to the respective predetermined directions (see FIG. 2).

Then, the controller 70 obtains, from each of the position sensors 28 to 33, the current angular position or rotation quantity of the corresponding joint of the tool support arm 12 measured by the corresponding position sensor in step S106. Then, in step S106, the controller 70 calculates, in the detector-based coordinate system 59, the current position and orientation of the predetermined reference point of the teaching member 41 according to the current angular position or rotation quantity of each joint of the teaching member support arm 42.

Next, the controller 70 obtains, according to the target position and the target orientation for the working point WP of the tool 11 in the detector-based coordinate system 59, a current position and a current orientation of the working point WP of the tool 11 in a target-position based coordinate system 68 in step S107 (see FIG. 4).

For example, the target-position based coordinate system 68 includes an origin O3 corresponding to the target position for the working point WP of the tool 11. That is, the target position for the working point WP of the tool 11 corresponds to the origin O3 of the target-position based coordinate system 68. The target-position based coordinate system 68 includes a first axis Z3 passing through the origin O3 and parallel to the vertical direction of the base 49. The target-position based coordinate system 68 also includes the other second and third axes X3 and Y3 extending from the origin O3 to be perpendicular to the first axis Z3 to the respective predetermined directions (see FIG. 4). The target-position based coordinate system 68 follows change of the target position for the working point WP.

Following the operation in step S107, the controller 70 establishes a movable range 81, i.e. a range of movement, of the tool 11 as illustrated in FIG. 4 in step S108. In step S108, the controller 70 establishes a movable range 81 of the tool 11; the movable range 81 at least includes a straight line L1 connecting the working point WP of the tool 11 and the target position, i.e. the origin O3 of the target-position based coordinate system 68, for the working point WP of the tool 11. For example, referring to FIG. 4, the movable range 81 according to this embodiment has a substantially rectangular parallelepiped space including the straight line L1 serving as the longest diagonal line of the rectangular parallelepiped movable range 81. The rectangular parallelepiped movable range 81 is also configured such that one side of the rectangular parallelepiped movable range 81 is parallel to the target orientation (see the arrow AR1 in FIG. 4) for the working point WP of the tool 11.

The operation in step S108 causes the controller 70 to allow movement of the tool 11 under the following requirements that (1) The working point WP of the tool 11 is maintained within the movable range 81, in other words, is prevented from going out of the movable range 81

(2) The straight line L1 serves as the longest diagonal line of the rectangular parallelepiped movable range 81.

Note that the controller 70 allows movement of the tool 11 on a side or a surface of the movable range 81.

In particular, the controller 70 changes the length of each side of the rectangular parallelepiped movable range 81 during movement of the tool 11 while meeting the requirements (1) and (2), thus normally reducing the volume of the rectangular parallelepiped movable range 81 according to movement of the tool 11. If motion of the patient's body causes the target position O3 for the working point WP of the tool 11 to further separate from the current position O of the working point WP of the tool 11, the controller 70 changes the length of each side of the rectangular parallelepiped movable range 81 to increase the volume of the rectangular parallelepiped movable range 81. This increase keeps the straight line L1 constituting the longest diagonal line of the rectangular parallelepiped movable range 81.

Following the operation in step S108, the controller 70, which serves as, for example, a determiner that determines whether the working point WP of the tool 11 has reached the target position O3 for the working point WP of the tool 11 in step S109.

Figure 5A:
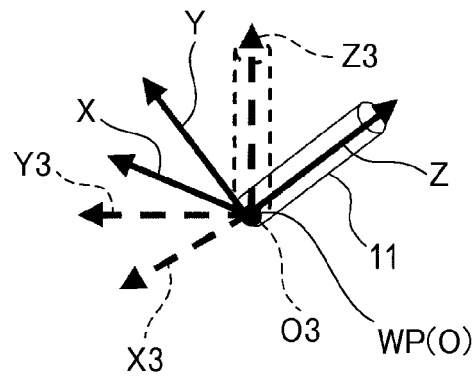
FIG. 5A is a view schematically illustrating an example of the situation where a working point of a tool has reached a target position according to the embodiment.

As illustrated in FIG. 5A, upon determination that the working point WP of the tool 11 has reached the target position O3 for the working point WP of the tool 11 (YES in step S109), the controller 70 keeps the current position of the working point WP of the tool 11 unchanged in step S110. Specifically, in step S110, the controller 70 locks rotation of each of the actuators 22 to 27 to maintain the current position of the working point WP of the tool 11 unchanged. After completion of the operation in step S110, the controller 70 switches its operation mode from the position control mode to the orientation control mode in step S111, thus terminating the first position change routine.

Otherwise, upon determination that the working point WP of the tool 11 has not reached yet the target position O3 for the working point WP of the tool 11 (NO in step S109), the controller 70 determines whether the selected state of the selection switch 60 indicates the orientation control mode in step S112.

Upon determination that the selected state of the selection switch 60 has been switched to the orientation control mode (YES in step S112), the controller 70 performs the operations in steps S110 and S111. After completion of the operations in steps S110 and S111, the controller 70 terminates the first position change routine. Specifically, the controller 70 fixes the current posture of the tool support arm 12 and switches its operation mode to the orientation control mode when the selection switch 60 has been switched from the position control mode to the orientation control mode even if the working point WP of the tool 11 has not reached yet the target position O3.

Otherwise, upon determination that the selected state of the selection switch 60 has not been switched to the orientation control mode, in other words, the selected state of the selection switch 60 has been maintained as the position control mode (NO in step S112), the first position control routine proceeds to step S113.

In step S113, the controller 70 determines whether the temporary target position for the working point WP of the tool 11 calculated in step S103 is located within the movable range 81 in step S113.

Figure 5B:
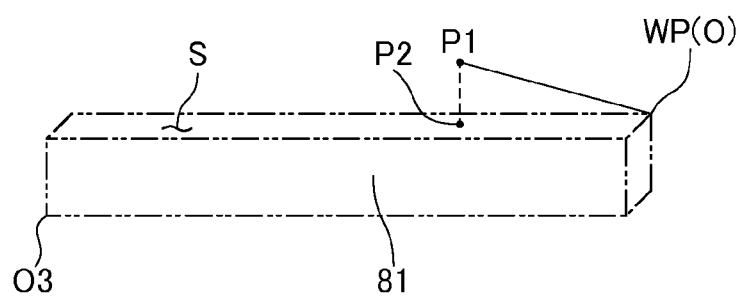
FIG. 5B is a view schematically illustrating how to correct a temporary target position that is not located within the movable range.

Upon determination that the temporary target position for the working point WP of the tool 11 calculated in step S103 is not located within the movable range 81 (NO in step S113), the controller 70 corrects the temporary target position for the working point WP of the tool 11 in step S114. In step S114, as illustrated in FIG. 5B, the controller 70 for example obtains a point P2 on a surface S of the rectangular parallelepiped movable range 81 through which a straight line L2 passing through an uncorrected temporary target position P1 located out of the movable range 81 passes as a normal line with respect to the surface S. Then, the controller 70 moves the uncorrected temporary target position P1 to the point P2 as a corrected temporary target position in step S114. After completion of the operation in step S114, the first position change routine proceeds to step S115.

Otherwise, upon determination that the temporary target position for the working point WP of the tool 11 calculated in step S103 is located within the movable range 81 (YES in step S113), the first position change routine proceeds to step S115 while skipping the operation in step S114.

In step S115, the controller 70 focuses on the device-based coordinate system 34. Then, in step S116, the controller 70 drives each of the actuators 22 to 27 to change the position and orientation of the working point WP of the tool 11. That is, the controller 70 changes the position of the working point WP of the tool 11 to the corrected or uncorrected temporary target position for the working point WP of the tool 11, and changes the orientation of the working point WP of the tool 11 to the temporary target orientation for the working point WP of the tool 11 in step S116.

Subsequently, the controller 70 obtains, from each of the position sensors 28 to 33, the current angular position or rotation quantity of the corresponding joint of the tool support arm 12 measured by the corresponding position sensor in step S117. Then, in step S118, the controller 70 calculates the current position and current orientation of the working point WP of the tool 11 according to the current angular position or rotation quantity of each joint of the tool support arm 12 obtained in step S117.

Following the operation in step S118, the controller 70 calculates the first difference between the current position of the working point WP of the tool 11 and the temporary target position, and the second difference between the current orientation of the working point WP of the tool 11 and the temporary target orientation in step S119. Then, in step S119, the controller 70 determines whether each of the first and second differences is zero. In other words, the controller 70 determines whether the current position of the working point WP of the tool 11 is identical to the temporary target position, and the current orientation of the working point WP of the tool 11 is identical to the temporary target orientation in step S119.

Upon determination that at least one of the first and second differences is not zero (NO in step S119), the controller 70 returns to the operation in step S116, and repeats the operations in step S116 and the subsequent steps.

Otherwise, upon determination that each of the first and second differences is zero (YES in step S119), the controller 70 terminates the first position change routine.

That is, the controller 70 is programmed to repeat the operations in steps S116 to S119 until it is determined that (1) The current position of the working point WP of the tool 11 is identical to the temporary target position (2) The current orientation of the working point WP of the tool 11 is identical to the temporary target orientation (YES in step S119).

Figure 6:
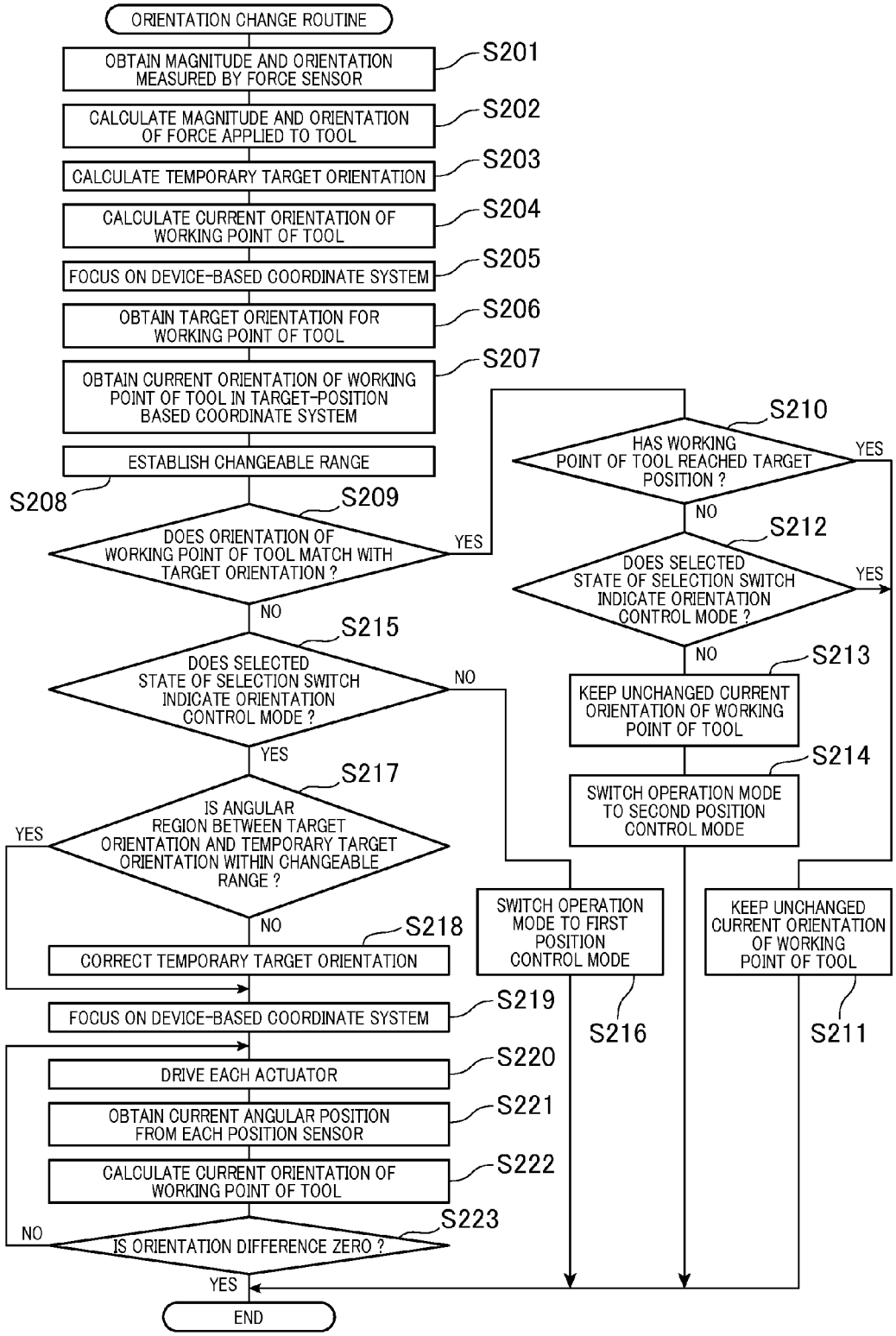
FIG. 6 is a flowchart schematically illustrating an example of the procedure of an orientation change routine carried out by a controller illustrated in FIG. 1.

Next, the following describes the orientation change routine carried out by the controller 70 with reference to the flowchart of FIG. 6. The controller 70 is programmed to start the orientation change routine upon determination that the force sensor 13 measures user's force applied to the tool 11 in the orientation control mode. The orientation control mode keeps unchanged the current position of the working point WP of the tool 11. Note that the routine of FIG. 6 includes some steps, which are similar to those in the routine of FIG. 3, and descriptions of the steps are therefore omitted or simplified.

When starting the orientation change routine, the controller 70 performs the operations in steps S201 and S202 that are respectively similar to the operations in steps S101 and S102.

In step S203, the controller 70 calculates, according to the magnitude and orientation of the force calculated in step S202, a temporary target orientation of the working point WP of the tool 11 in the device-based coordinate system 34. That is, the controller 70 calculates the temporary target orientation of the working point WP of the tool 11 because the position of the working point WP of the tool 11 has been secured in the first position change routine.

Following the operation in step S203, the controller 70 calculates the current orientation of the working point WP of the tool 11 according to the current angular position or rotation quantity of each joint of the tool support arm 12 measured by the corresponding position sensor in step S204.

Next, the controller 70 focuses on the detector-based coordinate system 59 in place of the device-based coordinate system 34 in step S205. Then, the controller 70 obtains, from each of the position sensors 28 to 33, the current angular position or rotation quantity of the corresponding joint of the tool support arm 12 measured by the corresponding position sensor in step S206. Then, in step S206, the controller 70 calculates, in the detector-based coordinate system 59, the current orientation of the predetermined reference point of the teaching member 41 according to the current angular position or rotation quantity of each joint of the teaching member support arm 42.

Figure 7A:
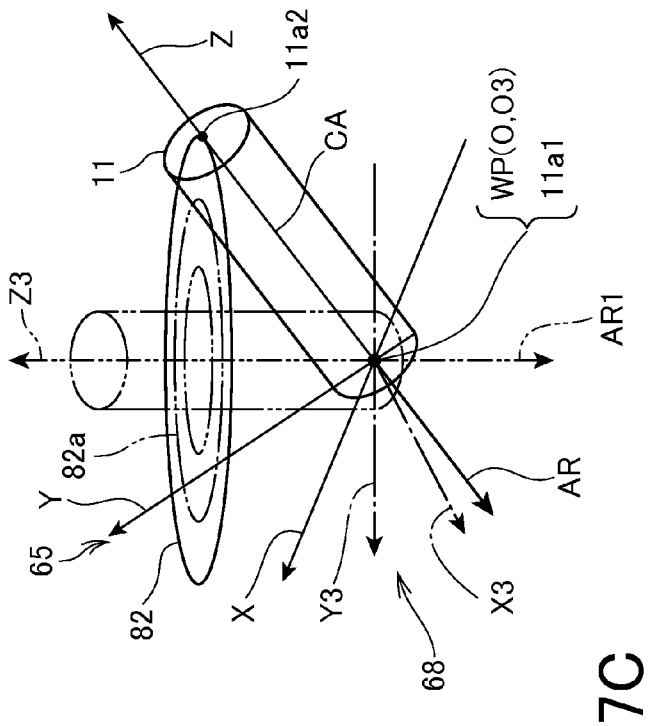
FIG. 7A is a view schematically illustrating an angular difference between the orientation of the tool and a target orientation according to the embodiment.

Following the operation in step S206, the controller 70 obtains, according to the target orientation for the working point WP of the tool 11 in the detector-based coordinate system 59, a current orientation AR of the working point WP of the tool 11 in the target-position based coordinate system 68 in step S207 (see FIG. 7A). Specifically, when the current position of the working point WP of the tool 11 matches with the target position O3 for the working point WP of the tool 11, the origin O of the tool-based coordinate system 65 also matches with the origin O3 of the target-position based coordinate system 68 (see FIG. 7A).

Subsequently, the controller 70 calculates the current angular difference θ between the current orientation AR of the working point WP of the tool 11 and the target orientation AR1 for the working point WP of the tool 11 in step S208. That is, the current angular difference θ is equivalent to the angular difference θ between the first axis Z of the tool-based coordinate system 65 and the first axis Z3 of the target-position based coordinate system 68.

Figure 7B:
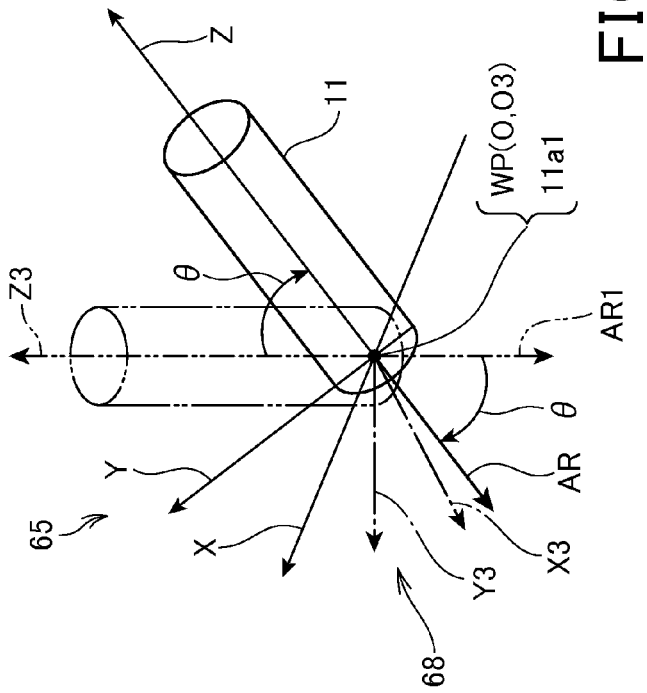
FIG. 7B is a view schematically illustrating an example of a changeable range for the angular difference.

Then, in step S208, the controller 70 establishes a changeable range 82 of the orientation of the center axis CA of the tool 11 as illustrated in FIG. 7B in step S208. The changeable range 82 has a substantially conical space defined by rotating the center axis CA of the tool 11 between the first end 11a1, i.e. working point WP, and the second end 11a2 of the tool 11 around the first axis Z3 of the target-position based coordinate system 68. The conical changeable range 82 has a circular bottom surface 82a.

Specifically the controller 70 allows change of the tool 11 for changing the orientation AR of the working point WA of the tool 11 if the angular difference between the first axis Z of the tool-based coordinate system 65 corresponding to a changed orientation of the working point WP of the tool 11 and the first axis Z3 of the target-position based coordinate system 68 is located within the conical changeable range 82.

In other words, the controller 70 tolerates change of the center axis CA of the tool 11 insofar as the angular difference between the changed orientation of the working point WP of the tool 11 and the target orientation AR1 is prevented from widening as compared with the current angular difference θ.

Figure 7C:
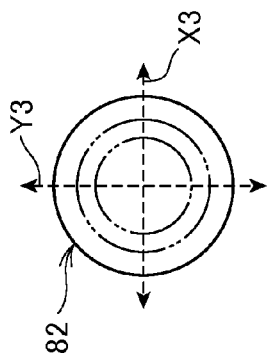
FIG. 7C is a plan view schematically illustrating how the changeable range is reduced with an approaching of the orientation of the tool to the target orientation.

When a user moves the tool 11 to gradually shift the orientation AR of the working point WA of the tool 11 to the target orientation AR1, the center axis CA of the tool 11 approaches the first axis Z of the target-position based coordinate system 68. This causes the volume of the conical changeable range 82 to decrease, i.e. the area of the circular bottom surface 82a to decrease (see two-dot chain line in FIGS. 7B and 7C).

Following the operation in step S208, the controller 70 determines whether the orientation AR of the working point WP of the tool 11 matches with the target orientation AR1 in step S209.

Upon determination that the orientation AR of the working point WP of the tool 11 matches with the target orientation AR1 (YES in step S209), the controller 70 determines whether the working point WP of the tool 11 has reached the target position O3 for the working point WP of the tool 11 in step S210. Specifically, if the orientation change routine is carried out after the affirmative determination in step S109 of the first position change routine, the determination in step S210 is affirmative. Otherwise, if the selected state of the selection switch 60 is switched to the orientation control mode before the working point WP of the tool 11 reaches the target position O3 so that the orientation change routine is carried out after the affirmative determination in step S112 of the first position change routine, the determination in step S210 is negative.

Upon determination that the working point WP of the tool 11 has reached the target position O3 for the working point WP of the tool 11 (YES in step S210), the controller 70 keeps unchanged the current orientation AR of the working point WP of the tool 11 in step S211. Specifically, in step S211, the controller 70 locks rotation of each of the actuators 22 to 27 to maintain the current orientation AR of the working point WP of the tool 11 unchanged.

After completion of the operation in step S211, the controller 70 terminates the orientation change routine. This completes the positioning of the tool 11 because the working point WP of the tool 11 has reached the target position O3 and the orientation AR of the working point WP of the tool 11 has been identical to the target orientation AR1.

Otherwise, upon determination that the working point WP of the tool 11 has not reached the target position O3 for the working point WP of the tool 11 (NO in step S210), the controller 70 determines whether the selected state of the selection switch 60 indicates the orientation control mode in step S212.

Upon determination that the selected state of the selection switch 60 indicates the orientation control mode (YES in step S212), the controller 70 performs the operation in step S211 set forth above, and terminates the orientation change routine. Thereafter, if the selection switch 60 is not operated by a user, the positioning of the tool 11 is completed while the orientation of the working point WP of the tool 11 is directed to the target orientation AR1 at a position different from the target position O3. This situation can occur when a user operates the selection switch 60 to intentionally switch the operation mode to the orientation control mode while the working point WP of the tool 11 is located close to the target position O3, so that the orientation AR of the working point WP of the tool 11 is parallel to the target orientation AR1. Then, the user terminates the positioning of the tool 11 while the working point WP of the tool 11 is located close to the target position O3.

Otherwise, upon determination that the selected state of the selection switch 60 does not indicate the orientation control mode (NO in step S212), the controller 70 keeps unchanged the current orientation AR of the working point WP of the tool 11 in step S213 in the same approach as step S211. Then, the controller 70 switches its operation mode to the second position control mode in step S214, terminating the orientation change routine.

On the other hand, upon determination that the orientation AR of the working point WP of the tool 11 does not match with the target orientation AR1 (NO in step S209), the controller 70 determines whether the selected state of the selection switch 60 indicates the orientation control mode in step S215.

Upon determination that the selected state of the selection switch 60 does not indicate the orientation control mode (NO in step S215), the controller 70 switches its operation mode to the first position control mode, and thereafter, terminates the orientation change routine.

Otherwise, upon determination that the selected state of the selection switch 60 indicates the orientation control mode (YES in step S215), the orientation control routine proceeds to step S217.

In step S217, the controller 70 determines whether the angular difference between the first axis Z3 of the target-position based coordinate system 68 and the first axis Z of the tool-based coordinate system 65 corresponding to the temporary target orientation for the working point WP of the tool 11 calculated in step S203 is located within the changeable range 82.

Upon determination that the angular difference between the first axis Z3 of the target-position based coordinate system 68 and the first axis Z of the tool-based coordinate system 65 corresponding to the temporary target orientation for the working point WP of the tool 11 calculated in step S203 is not located within the changeable range 82 (NO in step S217), the controller 70 corrects the temporary target orientation for the working point WP of the tool 11 in step S218.

In step S218, the controller 70 corrects the temporary target orientation of the working point WP of the tool 11 such that the angular difference between the first axis Z3 and the first axis Z corresponding to the corrected temporary target orientation for the working point WP of the tool 11 is located within the changeable range 82. For example, in step S218, the controller 70 obtains a line of intersection of a tool trajectory from the current orientation to the temporary target orientation with the conical changeable range 82. Then, in step S218, the controller 70 corrects the temporary target orientation such that the corrected temporary target orientation overlaps with the line of intersection. After completion of the operation in step S218, the orientation change routine proceeds to step S219.

Otherwise, upon determination that the angular difference between the first axis Z3 of the target-position based coordinate system 68 and the first axis Z of the tool-based coordinate system 65 corresponding to the temporary target orientation for the working point WP of the tool 11 calculated in step S203 is located within the changeable range 82 (YES in step S217), the orientation change routine proceeds to step S219 while skipping the operation in step S218.

The following operations in steps S219 to S221 are substantially identical to those in steps S115 to S117, and therefore, descriptions of the operations in steps S219 to S221 are omitted.

In step S222, the controller 70 calculates the current orientation of the working point WP of the tool 11 according to the current angular position or rotation quantity of each joint of the tool support arm 12 obtained in step S221.

Following the operation in step S222, the controller 70 calculates the difference between the current orientation of the working point WP of the tool 11 and the temporary target orientation in step S223. Then, in step S223, the controller 70 determines whether the difference is zero. In other words, the controller 70 determines whether the current orientation of the working point WP of the tool 11 is identical to the temporary target orientation in step S223.

Upon determination that difference is not zero (NO in step S223), the controller 70 returns to the operation in step S220, and repeats the operations in step S220 and the subsequent steps.

Otherwise, upon determination that the difference is zero (YES in step S223), the controller 70 terminates the orientation change routine.

That is, the controller 70 is programmed to repeat the operations in steps S220 to S223 until it is determined that the current orientation of the working point WP of the tool 11 is identical to the temporary target orientation (YES in step S223).

Figure 8:
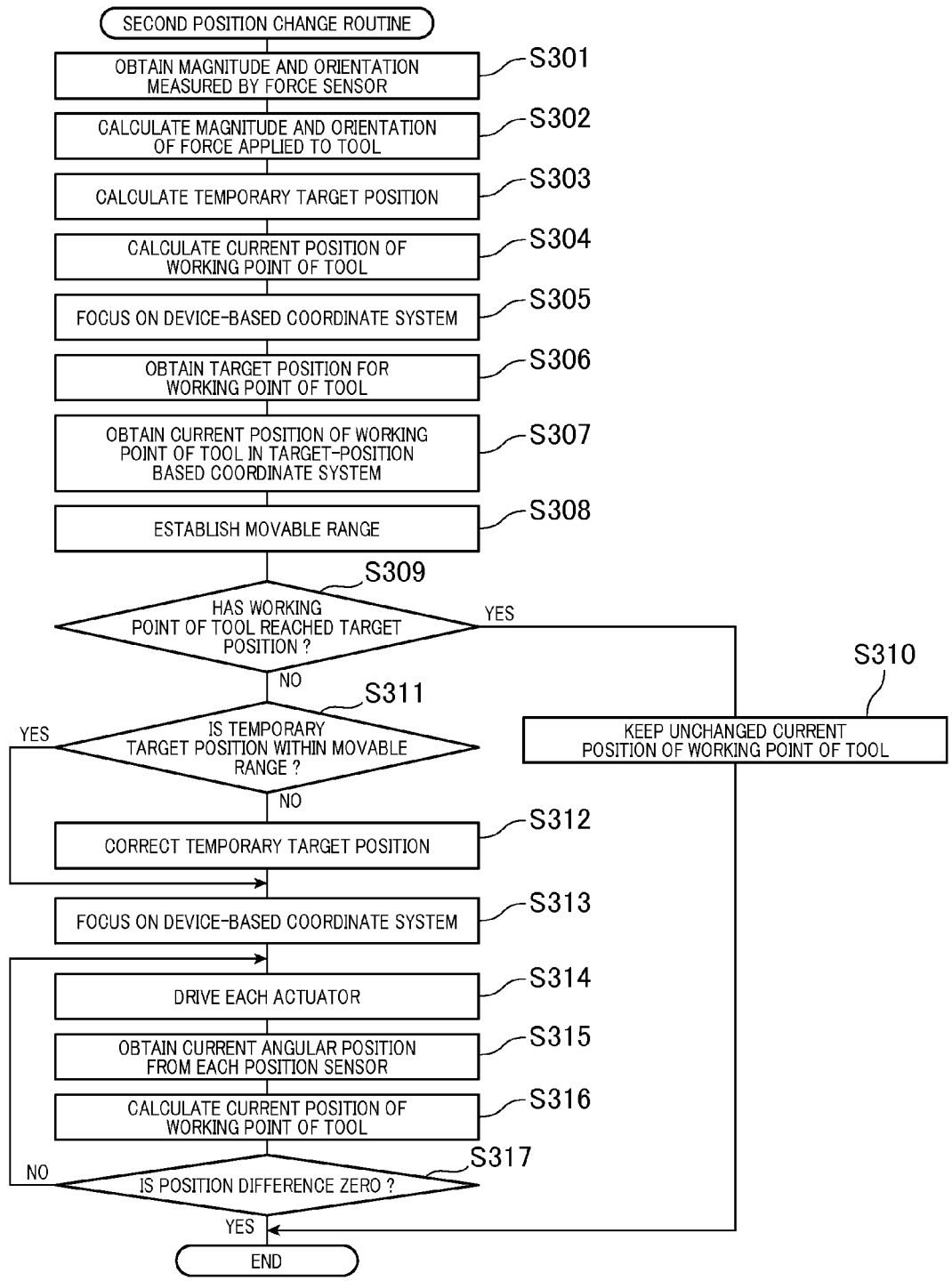
FIG. 8 is a flowchart schematically illustrating an example of the procedure of a second position change routine carried out by a controller illustrated in FIG. 1.

Next, the following describes the second position change routine carried out by the controller 70 with reference to the flowchart of FIG. 8. The controller 70 is programmed to start the second position change routine upon determination that the force sensor 13 measures user's force applied to the tool 11 in the second position control mode. The second position control mode keeps unchanged the current orientation of the working point WP of the tool 11. Note that the routine of FIG. 8 includes some steps, which are similar to those in the routine of FIG. 3, and descriptions of the steps are therefore omitted or simplified.

When starting the second position change routine, the controller 70 performs the operations in steps S301 and S302 that are respectively similar to the operations in steps S101 and S102.

In step S303, the controller 70 calculates, according to the magnitude and orientation of the force calculated in step S302, a temporary target position of the working point WP of the tool 11 in the device-based coordinate system 34. That is, the controller 70 calculates the temporary target position of the working point WP of the tool 11 because the orientation of the working point WP of the tool 11 has been secured in the orientation change routine.

Following the operation in step S303, the controller 70 calculates the current position of the working point WP of the tool 11 according to the current angular position or rotation quantity of each joint of the tool support arm 12 measured by the corresponding position sensor in step S304.

Next, the controller 70 focuses on the detector-based coordinate system 59 in place of the device-based coordinate system 34 in step S305. Then, the controller 70 obtains, from each of the position sensors 28 to 33, the current angular position or rotation quantity of the corresponding joint of the tool support arm 12 measured by the corresponding position sensor in step S306. Then, in step S306, the controller 70 calculates, in the detector-based coordinate system 59, the current position of the predetermined reference point of the teaching member 41 according to the current angular position or rotation quantity of each joint of the teaching member support arm 42.

Following the operation in step S306, the controller 70 obtains, according to the target orientation for the working point WP of the tool 11 in the detector-based coordinate system 59, a current position of the working point WP of the tool 11 in the target-position based coordinate system 68 in step S307.

Subsequently, the controller 70 establishes the movable range 81 in step S308 in the same approach as the operation in step S108.

Following the operation in step S308, the controller 70 determines whether the working point WP of the tool 11 has reached the target position O3 for the working point WP of the tool 11 in step S309.

Upon determination that the working point WP of the tool 11 has reached the target position O3 for the working point WP of the tool 11 (YES in step S309), the controller 70 keeps unchanged the current position of the working point WP of the tool 11 in step S310. Thereafter, the controller 70 terminates the second position change routine. This completes the positioning of the tool 11 because the working point WP of the tool 11 has reached the target position O3 and the orientation AR of the working point WP of the tool 11 has been identical to the target orientation AR1.

Otherwise, upon determination that the working point WP of the tool 11 has not reached the target position O3 for the working point WP of the tool 11 (NO in step S309), the second position change routine proceeds to step S311.

The following operations in steps S311 to S315 are substantially identical to those in steps S113 to S117, and therefore, descriptions of the operations in steps S311 to S315 are omitted.

In step S316, the controller 70 calculates the current position of the working point WP of the tool 11 according to the current angular position or rotation quantity of each joint of the tool support arm 12 obtained in step S315.

Following the operation in step S316, the controller 70 calculates the difference between the current position of the working point WP of the tool 11 and the temporary target position in step S317. Then, in step S317, the controller 70 determines whether the difference is zero. In other words, the controller 70 determines whether the current position of the working point WP of the tool 11 is identical to the temporary target position in step S317.

Upon determination that difference is not zero (NO in step S317), the controller 70 returns to the operation in step S314, and repeats the operations in step S314 and the subsequent steps.

Otherwise, upon determination that the difference is zero (YES in step S317), the controller 70 terminates the second position change routine.

That is, the controller 70 is programmed to repeat the operations in steps S314 to S317 until it is determined that the current position of the working point WP of the tool 11 is identical to the temporary target position (YES in step S317).

Note that the teaching member 41, the teaching member support arm 42, and the operations in steps S106, S206, and S306 serve as, for example, an obtainer that obtains the target position for the working point WP of the tool 11 to reach, and the target orientation for the orientation of the tool 11 to match with. In particular, the teaching member 41 serves as, for example, a reference member. The teaching member support arm 42 serves as, for example, a second support configured to support the teaching member 41 and deformed to locate the teaching member 41 to the predetermined reference position while the orientation of the teaching member 41 is associated with the target orientation for the orientation of the tool 11.

One or more operations in steps S104, S118, S304, and S316 serve as, for example, a first calculator, and one or more operations in steps S104, S118, S204, and S222 serve as, for example, a second calculator.

One or more operations in steps S108, S110, and S308 serve as, for example, a first limiter, and the operation in step S208 serves as, for example, a second limiter.

The aforementioned positioning control apparatus 1, i.e. its controller 70, of this embodiment permits movement of the working point WP of the tool 11 if the working point WP of the tool 11 is located within the movable range 81. The positioning control apparatus 1 also reduces in size the movable range 81 depending on movement of the working point WP of the tool 11. Additionally, the positioning control apparatus 1 permits movement of the working point WP of the tool 11 if the angular difference between the moved orientation of the working point WP of the tool 11 and the target orientation AR1 is prevented from widening as compared with the current angular difference between the current orientation of the moved working point WP of the tool 11 and the target orientation AR1.

This configuration of the positioning control apparatus 1 reduces unnecessary movement of the working point WP of the tool 11 during transfer of the working point WP of the tool 11 to the target position O3 for the working point WP of the tool 11. This configuration of the positioning control apparatus 1 also reduces unnecessary change of the orientation of the working point WP of the tool 11 during adjustment of the orientation of the working point WP of the tool 11 to the target orientation AR1 for the working point WP of the tool 11.

Additionally, the positioning control apparatus 1 gradually reduces each of the movable range 81 and the changeable range 82 for the working point WP of the tool 11 depending on the approach of the working point WP of the tool 11 to a corresponding one of the target position O3 and the target orientation AR1. This configuration enables the working point WP of the tool 11 to reliably reach the target position O3 even if a user cannot visibly recognize the target position O3 due to, for example, teeth around the missing tooth and/or a hand of an assistant. This configuration also enables the orientation of the working point WP of the tool 11 to reliably match with the target orientation AR1 even if a user cannot visibly recognize the target orientation AR1.

Let us consider another approach, which establishes a line connecting between the current position of the working point WP of the tool 11 and the target position O3 as a movable range of the working point WP in order to reduce unnecessary movement of the working point WP of the tool 11. Unfortunately, this approach may not avoid obstacles, such as teeth around the missing tooth and/or a hand of an assistant, if these obstacles are located on the line as the movable range.

In contrast, the positioning control apparatus 1 permits movement of the tool 11 if the working point WP of the tool 11 is located within the rectangular parallelepiped movable range 81. This configuration therefore makes it possible to transfer the working point WP of the tool 11 to the target position O3 while avoiding obstacles even if the obstacles are located within the rectangular parallelepiped movable range 81. Similarly, the positioning control apparatus 1 permits change of the orientation of the working point WP of the tool 11 if the angular difference between the changed orientation of the working point WP of the tool 11 and the target orientation from increasing. This configuration therefore makes it possible to adjust the orientation of the working point WP of the tool 11 to the target orientation AR1 while avoiding obstacles even if the obstacles are located within the rectangular parallelepiped movable range 81.

Moreover, the positioning control apparatus 1 includes the target position detector 40, and the controller 70 obtains in real-time information about the target position O3 and the target orientation AR1. The configuration enables the controller 70 to establish again the movable range 81 and the changeable range 82 when the target position and the target orientation change. This configuration therefore enables a user to move the working point WP of the tool 11 to the target position O3 and to adjust the orientation of the working point WP to the target orientation AR1 even if the target position O3 changes due to, for example, the body motion of the patient.

Furthermore, the positioning control apparatus 1 includes the selection switch 60. The controller 70 of the positioning control apparatus 1 is capable of switching its operation mode between the orientation control mode and the position control mode according to change of the selected state of the selection switch 60.

For example, the controller 70 automatically switches its operation mode to the orientation control mode upon determination that the working point WP of the tool 11 has reached the target position O3 for the working point WP of the tool 11. In this case, if no selection switch 60 was provided in the positioning control apparatus 1 according to this embodiment, a user might not recognize the operation mode of the controller 70 has been switched to the orientation control mode. This might result in user's unintentional change of the orientation of the working point WP of the tool 11 despite a user's intention to change the position of the working point WP of the tool 11.

In contrast, the positioning control apparatus 1 with the selection switch 60 enables a user to select one of the position control mode and the orientation control mode according to the user's intention. This configuration therefore reduces the possibility of the occurrence of unintentional movement of the tool 11.

The present disclosure is not limited to the aforementioned embodiment, and various modifications of the embodiment can be performed within the scope of the present disclosure.

The controller 70 of the positioning control apparatus 1 of the above embodiment is configured to start the positioning control of the tool 11 from the first control mode, and thereafter switch its operation mode to the orientation control mode, but the present disclosure is not limited thereto. Specifically, the controller 70 of the positioning control apparatus 1 can be configured to start the positioning control of the tool 11 from the orientation control mode, and thereafter switch its operation mode to the first or second position control mode. The controller 70 can switch its operation mode between the first or second position control mode and the orientation control mode plural times if the selection switch 60 is not used.

For example, the controller 70 can switch its operation mode from the first or second position control mode to the orientation control mode, and switch its operation mode from the orientation control mode to the first or second position control mode again. In this example, the controller 70 can switch its operation mode from the first or second position control mode to the orientation control mode when an x coordinate of the working point WP of the tool 11 in the second coordinate axis X matches with an x coordinate of the target position O3 in the second coordinate axis X3. Thereafter, the controller 70 can switch its operation mode from the orientation control mode to the first or second position control mode again when the orientation of the working point WP of the tool 11 matches with the target orientation AR1. After the matching, the controller 70 can match y and z coordinates of the working point WP of the tool 11 in the respective first and third coordinate axes Y and Z matches with y and z coordinates of the target position O3 in the respective first and third coordinate axes Y3 and Z3.

The controller 70 in the first position control mode can move the tool 11 while restricting change of the orientation of the tool 11 independently of whether the orientation of the working point WP of the tool 11 is directed to the target orientation AR1.

The controller 70 of this embodiment obtains change of the position and the orientation of the predetermined reference point of the teaching member 41 fixedly located at the reference object, i.e. the predetermined tooth close to the missing tooth, to thereby obtain change of each of the target position and the target orientation for the working point WP of the tool 11 over time. The present disclosure is however not limited to the configuration.

Specifically, the target position detector 40 can be differently configured as a camera system 40A in comparison to the target position detector 40 illustrated in FIGS. 1 and 2. The camera system includes a camera 40a movably located to pick up images inside of the mouth of a patient, and the controller 70 can obtain, according to the picked-up images, changes in each of the target position and the target orientation for the working point WP of the tool 11. The target position detector 40 can also be differently configured as a magnetic detection system 40B in comparison to the target position detector 40 illustrated in FIGS. 1 and 2. The magnetic detection system 40B includes a magnetic sensor 40b movably located to measure changes in the magnetic field in the mouth depending on the target position and the target orientation for the working point WP of the tool 11. The controller 70 can obtain, according to the temporal change of the magnetic field in the mouth, temporal change of each of the target position and the target orientation for the working point WP of the tool 11.

The present disclosure can eliminate the target position detector 40 from the positioning control apparatus 1 of this embodiment. The controller of the positioning control apparatus according to this modification can have store therein the target position and the target orientation for the working point WP of the tool 11.

The present disclosure can also eliminate the selection switch 60. The controller of the positioning control apparatus according to this modification can be configured to (1) Switch its operation mode from the first or second position control mode to the orientation control mode upon determination that the working point WP of the tool 11 has reached the target position O3

(2) Switch its operation mode from the orientation control mode to the first or second position control mode upon determination that the orientation of the working point WP of the tool 11 matches with the target orientation AR1.

The movable range 81 according to this embodiment has a substantially rectangular parallelepiped space whose longest diagonal line serves as the connecting line L1 connecting the working point WP of the tool 11 and the target position O3, but the present disclosure is not limited thereto. Specifically, a movable range according to a modification can have a symmetric space, such as a cylindrical or conical space, with respect to the connecting line L1 connecting the working point WP of the tool 11 and the target position O3. A movable range can have a three-dimensional space if each of the current position of the working point WP of the tool 11 and the target position is located at a corresponding one of a surface and an apex of the three-dimensional movable range. Like the first embodiment, let us consider a case where a movable range has a substantially rectangular parallelepiped space. In this case, the current position of the working point WP of the tool 11 can be located at an apex of the rectangular parallelepiped movable range, and the target position O3 can be located at another apex of the rectangular parallelepiped movable range, which is the farthest from the apex corresponding to the current position of the working point WP of the tool 11.

Let us consider another case where a movable range has a conical space whose center axis matches with the connecting line L1 connecting the working point WP of the tool 11 and the target position O3. In this case, the target position O3 can be located at the tip of the conical movable range, and the current position of the working point WP of the tool 11 can be located on a bottom surface of the conical movable range, such as the center of the bottom surface.

Let us also consider a case where a movable range has a solid space. In this case, the controller 70 can reduce the volume of the solid movable range without change of the graphic type of the solid space.

Let us take this feature using a rectangular parallelepiped movable range. That is, reducing the volume of the rectangular parallelepiped movable range without change of the graphic type of the rectangular parallelepiped movable range means that the movable range is maintained to have a rectangular parallelepiped space both prior to and subsequent to the volume reduction. In this case, the rectangular parallelepiped space of the movable range prior to the volume reduction can be geometrically similar or dissimilar to the rectangular parallelepiped space of the movable range subsequent to the volume reduction.

Let us further consider a case where a movable range has a symmetric space with respect to the connecting line L1 connecting the working point WP of the tool 11 and the target position O3. In this case, the controller 70 can reduce the volume of the movable range having a symmetric space while keeping the shape of the movable range geometrically symmetric both prior to and subsequent to the volume reduction.

Another object except for the tool 11, which the positioning control apparatus 1 aims to position, can be used.

The tool 11 includes a drill for cutting away part of a jawbone and/or tooth of a patient, but the drill can be used for cutting away part of another bone of a patient, or also used for cutting away part of an object except for a bone or a tooth.

The positioning control apparatus 1 according to this embodiment can be used in the medical field, in particular, the dental field, but can be used in another field, such as various industrial fields.

The controller 70 according to this embodiment measures the magnitude and orientation of force applied to the tool 11, but the controller 70 according to a modification can measure a point of the tool 11 to which the force is applied in addition to the magnitude and orientation of the applied force. If the application point of force on the tool 11 is different from a predetermined control point on the tool 11, the controller 70 may obtain moment of force around the control point even if a user applies translational force to the tool 11, and may rotate at least one joint of the tool support arm 12. However, the controller 70 according to this modification can control the posture of the tool support arm 12 according to force applied by a user to the tool 11 even if the point of force on the tool 11 to which the force is applied is different from the predetermined control point on the tool 11.

The controller 70 according to this embodiment corrects the temporary target position for the working point WP of the tool 11 upon negative determination in step S113 that the temporary target position for the working point WP of the tool 11 is not located within the movable range 81, but the present disclosure is not limited thereto. Specifically, the controller 70 cannot correct the temporary target position for the working point WP of the tool 11 upon negative determination in step S113. In this modification, the controller 70 can terminate the first or second position change routine without movement of the tool 11 upon negative determination in step S113.

Similarly, the controller 70 cannot correct the temporary target orientation for the working point WP of the tool 11 upon negative determination in step S217 that the angular difference between the first axis Z3 of the target-position based coordinate system 68 and the first axis Z of the tool-based coordinate system 65 corresponding to the temporary target orientation is not located within the changeable range 82. In this modification, the controller 70 can terminate the orientation change routine without change of the orientation of the working point WP of the tool 11 upon negative determination in step S217.

The positioning control apparatus 1 according to this embodiment has the first and second position control modes, but can have any one of the first and second position control modes, or can have three or more position control modes.

The function of one element constituting the positioning control apparatus 1 according to this embodiment can be distributed into plural elements, or the functions of plural elements constituting the positioning control apparatus 1 according to this embodiment can be integrated into one element. A part of the configuration of the positioning control apparatus 1 according to this embodiment can be replaced with a known configuration having the same function as the function of the part of the configuration.

While the illustrative embodiment of the present disclosure has been described herein, the present disclosure is not limited to the embodiment described herein, but includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

What is claimed is:

1. An apparatus for controlling the positioning of an object having a specified point, the apparatus comprising:
    a support arm that deformably supports the object while a position of the specified point of the object and a specified orientation that the object has are changeable, the support arm having a plurality of joints;
    a plurality of position sensors, each sensing at least one of an angular position and a rotation quantity of a corresponding joint from the plurality of joints; and
    a controller in communication with the plurality of position sensors and configured to:
    calculate the position of the specified point of the object according to how the support arm is deformed based on the angular position and the rotation quantity of each of the plurality of joints sensed by the plurality of position sensors;
    calculate the specified orientation of the object according to how the support arm is deformed based on the angular position and the rotation quantity of each of the plurality of joints sensed by the plurality of position sensors;
    establish a movable range of the specified point of the object, and limits movement of the specified point of the object within the movable range, the movable range including a line connecting the position of the specified point of the object calculated by controller and a target position for the specified point of the object to reach;
    limit change of the specified orientation of the object from increasing an angular difference between the specified orientation of the object calculated by the controller and a target orientation for the specified orientation of the object; and
    move a position of the object within the movable range while limiting change of the specified orientation of the object from increasing the angular difference between the specified orientation of the object and the target orientation for the specified orientation of the object;
    wherein the object is a medical tool.

2. The apparatus according to claim 1, wherein the controller is configured to obtain:
    the target position for the specified point of the object to reach, and
    the target orientation for the specified orientation of the object.

3. The apparatus according to claim 2, wherein the controller is further configured to reduce the movable range with approach of the specified point of the object to the target position.

4. The apparatus according to claim 2, further comprising:
    a reference member located on a predetermined reference object, the reference member having a predetermined reference point close to the target position for the specified point of the object, the reference member having a specified orientation;

a second support configured to support the reference member and deformed to locate the reference member to a predetermined reference position while the specified orientation of the reference member is associated with the target orientation for the specified orientation of the object; and the controller is configured to obtain, according to how the second support is deformed, the predetermined reference position and the specified orientation of the reference member, and to obtain, according to the predetermined reference position and the specified orientation of the reference member, the target position and the target orientation.

5. The apparatus according to claim 1, wherein the movable range has a predetermined type of a three-dimensional space having a plurality of surfaces and a plurality of apexes, the position of the specified point being located at one of the surfaces or one of the apexes, and the target position being located at another one of the surfaces or another one of the apexes, the controller being further configured to reduce a volume of the three-dimensional space of the movable range with an approaching of the specified point of the object to the target position while maintaining the predetermined type of the three-dimensional space unchanged.

6. The apparatus according to claim 1, wherein the movable range has a rectangular parallelepiped space, the rectangular parallelepiped space having a straight line serving as a longest diagonal line thereof, the straight line connecting the position of the specified point of the object and the target position, the controller being further configured to reduce a volume of the rectangular parallelepiped space of the movable range while maintaining the straight line serving as the longest diagonal line of the rectangular parallelepiped space.

7. The apparatus according to claim 1, wherein the controller is further configured to:

determine whether the specified point of the object has reached the target position, keep unchanged the position of the specified point of the object upon determination that the specified point of the object has reached the target position, and limit change of the specified orientation of the object from increasing the angular difference between the specified orientation of the object calculated by the controller and the target orientation for the specified orientation of the object after determination that the specified point of the object has reached the target position.

8. The apparatus according to claim 1, further comprising:

a selection switch configured to select one of a first control mode and a second control mode;

wherein the controller is further configured to:

limit movement of the specified point of the object within the movable range while disabling the controller from limiting change of the specified orientation of the object from increasing the angular difference upon the selection switch selecting the first control mode; and limit change of the specified orientation of the object from increasing the angular difference while keeping unchanged the position of the specified point of the object upon the selection switch selecting the second control mode.

9. The apparatus according to claim 1, wherein the medical tool is a drill for cutting away part of at least one of a tooth or a bone of a patient.

10. The apparatus according to claim 1, wherein the controller is further configured to:

establish a changeable angular range defined based on a relationship between a first coordinate axis and a second coordinate axis, the first coordinate axis including the specified orientation of the object, the second coordinate axis including the target orientation, for the specified orientation of the object, and limit change of the specified orientation of the object such that a second angular difference between the first coordinate axis and the second coordinate axis is within the changeable angular range.

* * * * *